(12) United States Patent
Yamaguchi et al.

(10) Patent No.: US 7,715,020 B2
(45) Date of Patent: May 11, 2010

(54) THREE-DIMENSIONAL SHAPE MEASURING SYSTEM

(75) Inventors: Wataru Yamaguchi, Sakai (JP); Shinichi Horita, Osaka (JP); Yoshihisa Abe, Sakai (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 205 days.

(21) Appl. No.: 11/811,781

(22) Filed: Jun. 12, 2007

(65) Prior Publication Data

US 2007/0291281 A1 Dec. 20, 2007

(30) Foreign Application Priority Data

Jun. 15, 2006 (JP) .............................. 2006-166207

(51) Int. Cl.
G01B 11/24 (2006.01)
G01B 11/30 (2006.01)
(52) U.S. Cl. .................. 356/606; 356/601; 356/609
(58) Field of Classification Search ......... 356/601–609, 356/243.1–243.8; 382/154, 118; 702/167, 702/159; 250/559.22–559.23
See application file for complete search history.

(56) References Cited

U.S. PATENT DOCUMENTS

| | | | | |
|---|---|---|---|---|
| 6,396,589 | B1 * | 5/2002 | Ebihara ...................... | 356/601 |
| 7,123,292 | B1 * | 10/2006 | Seeger et al. ............. | 348/218.1 |
| 7,310,154 | B2 * | 12/2007 | Kitaguchi et al. ........... | 356/603 |
| 7,324,217 | B2 * | 1/2008 | Herrmann et al. ........... | 356/606 |
| 7,454,054 | B2 | 11/2008 | Fukumoto ................... | 382/154 |
| 2002/0171847 | A1 * | 11/2002 | Fukumoto et al. ........... | 356/606 |
| 2006/0290945 | A1 * | 12/2006 | Kubo et al. ................ | 356/601 |
| 2008/0144045 | A1 * | 6/2008 | Bennison et al. ............ | 356/614 |

FOREIGN PATENT DOCUMENTS

| | | |
|---|---|---|
| JP | 60-129606 A | 7/1985 |
| JP | 6-58212 B2 | 8/1994 |
| JP | 7-160893 A | 6/1995 |

(Continued)

OTHER PUBLICATIONS

Japanese "Notice of Reasons for Rejection" dated Nov. 18, 2008 for counterpart Japanese Application No. 2006-166207; Together with an English-language translation thereof.

Primary Examiner—Tarifur Chowdhury
Assistant Examiner—Michael Lapage
(74) Attorney, Agent, or Firm—Sidley Austin LLP

(57) ABSTRACT

A three-dimensional shape measuring system is provided with a measuring unit having a three-dimensional measurement range and adapted to measure the three-dimensional shape of a measurement object in a noncontact manner, a measurement range shifting unit for shifting the position of the measurement range of the measuring unit, a shape calculating unit for calculating the overall three-dimensional shape of the measurement object from a plurality of measurement data obtained by shifting the measurement range relative to the measurement object, and a judging unit for setting judgment areas in specified peripheral areas within the measurement range and judging the presence or absence of any unmeasured area of the measurement object outside the measurement range based on measurement data corresponding to the judgment areas. The measurement range shifting unit shifts the position of the measurement range in a direction toward the unmeasured area when the presence of the unmeasured area is judged by the judging unit.

21 Claims, 15 Drawing Sheets

FOREIGN PATENT DOCUMENTS

| | | | |
|---|---|---|---|
| JP | 8-327337 A | 12/1996 |
| JP | 2001-201325 A | 7/2001 |
| JP | 3501359 B2 | 12/2003 |
| JP | 2004-85467 A | 3/2004 |
| JP | 2005-321278 A | 11/2005 |
| JP | 2006-30873 A | 2/2006 |

* cited by examiner

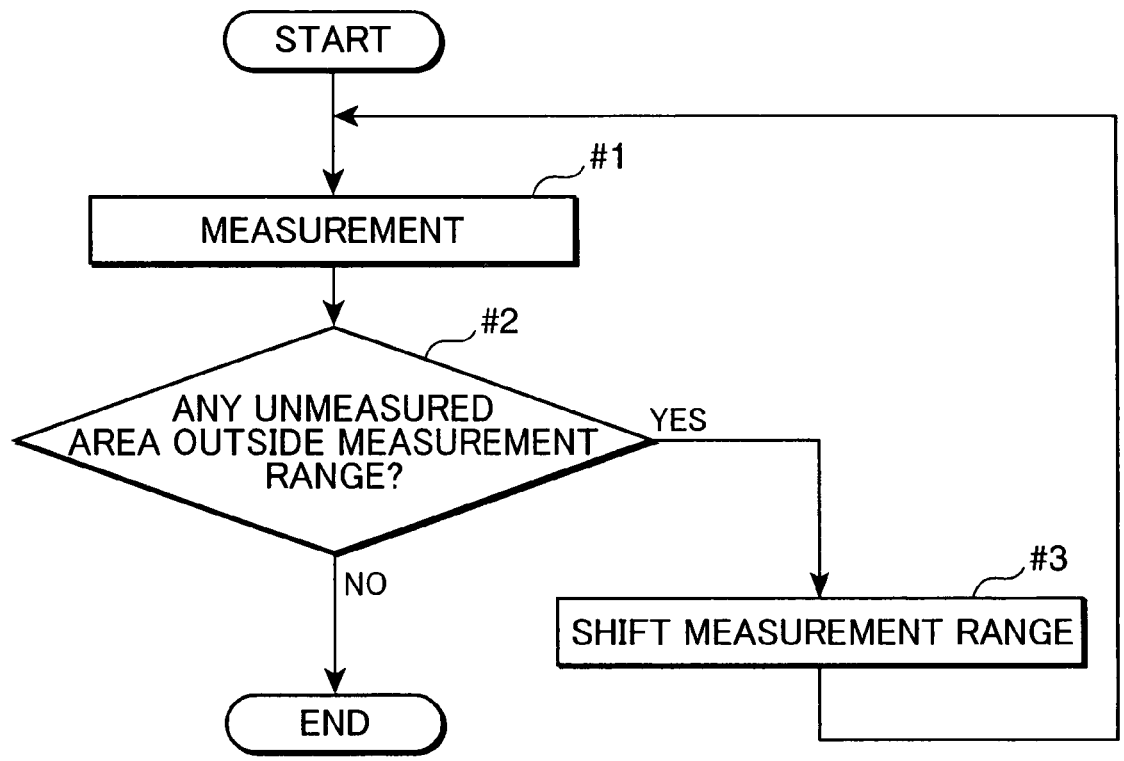

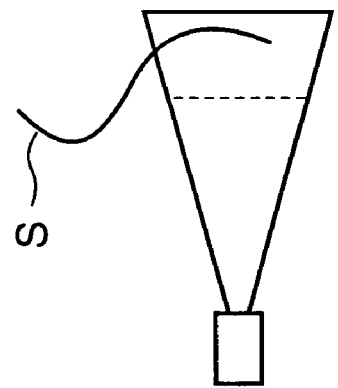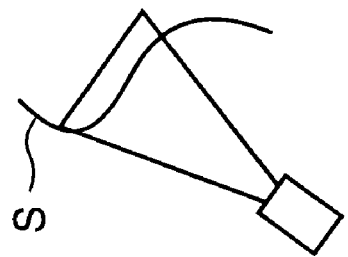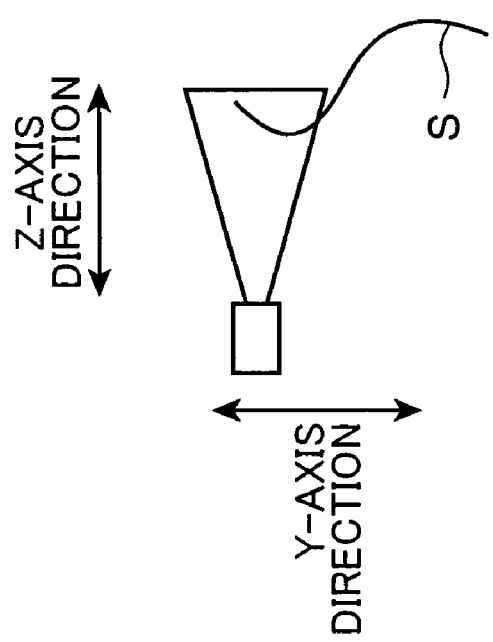

THREE-DIMENSIONAL SHAPE MEASURING SYSTEM

This application is based on Japanese Patent Application No. 2006-166207 filed on Jun. 15, 2006, the contents of which are hereby incorporated by reference.

BACKGROUND OF THE INVENTION

1. Field of the Invention

The present invention relates to a three-dimensional (hereinafter, referred to as "3D") shape measuring system for measuring the 3D shape of a measurement object.

2. Description of the Background Art

There has been conventionally known a noncontact 3D shape measuring device for measuring fragmentary 3D shapes of a measurement object in a noncontact manner at a plurality of measurement positions around the measurement object whose shape is to be measured and measuring the overall 3D shape of the measurement object based on these measurement results. The following patent literatures are, for example, known to disclose a technique of measuring the 3D shape of a shape measurement object.

Japanese Patent Unexamined Publication No. 2001-201325 discloses a technique of synthesizing a plurality of partial images for the purpose of obtaining a clear two-dimensional (hereinafter, referred to as "2D") image having the focus adjusted to the entire object to be observed (micro-object). Here, the plurality of partial images are obtained by performing an operation of specifying a part within the depth of focus of the object to be observed from interference fringes of a 2D interferometer, extracting the image of this part and storing this image in a memory a plurality of times.

Japanese Patent Unexamined Publication No. H07-160893 discloses a technique of obtaining 3D information by successively obtaining edge images of an object from time-series images picked up by photographing the same object by a camera from different viewpoints, and estimating a moved amount of the camera this time based on the 3D information of the object restored up to the last time and the edge images of the object at the present point in time.

In a technique disclosed in Japanese Patent No. 3501359, an image of an object is picked up a plurality of times while the focus position is cyclically moved. Then, the process of extracting focused pixels (in-focus pixels) from the respective images is performed for the last cycle, and the extracted in-focus image for the last cycle are synthesized. This synthesized image is displayed on a liquid crystal monitor.

Japanese Patent Examined Publication No. H06-58212 discloses a technique of picking up an image of a measurement object a multiple of times while changing an in-focus position, determining focused images for parts of the measurement object from a multitude of obtained images, and obtaining three-dimensional coordinates 3D coordinates of the respective parts.

In the conventional 3D shape measurement of the measurement object, an operator had to judge whether or not any unmeasured area exists on the measurement object outside the present measurement range. Further, if the operator judges the presence of the unmeasured area outside the present measurement range, it was difficult to properly set a destination of the measurement range (moving amount and moving direction) in order to perform a measuring operation at the next measurement position.

In order to avoid this, it can be thought to perform the measuring operation by setting a moving pitch of the measurement range beforehand and moving the measurement range at the set moving pitches within a specified area regardless of 3D shape of the measurement object. However, there are cases where the measurement range is moved and the measuring operation is performed despite the absence of the unmeasured area outside the present measurement range, thereby causing occurrences of unnecessary operations and prolonging the measurement. It should be noted that a technique of automatically determining the destination of the measurement range for the measuring operation at the next measurement position is disclosed in none of the above four patent literatures.

SUMMARY OF THE INVENTION

An object of the present invention is to provide a 3D shape measuring device capable of reducing time inflicted on an operator and a measurement time.

In order to accomplish this object, one aspect of the present invention is directed to a 3D shape measuring system, comprising a measuring unit having a three-dimensional measurement range 3D and adapted to measure the 3D shape of a measurement object in a noncontact manner; a measurement range shifting unit for shifting the position of the measurement range of the measuring unit; a shape calculating unit for calculating the overall 3D shape of the measurement object from a plurality of measurement data obtained by shifting the measurement range relative to the measurement object; and a judging unit for setting a judgment area in a specified peripheral part in the measurement range and judging the presence or absence of any unmeasured area for the measurement object outside the measurement range based on the measurement data corresponding to the judgment area, wherein the measurement range shifting unit shifts the position of the measurement range in a direction toward the unmeasured area when the presence of the unmeasured area is judged by the judging unit.

According to this construction, there can be realized a 3D shape measuring system capable of automatically shifting a measuring range.

BRIEF DESCRIPTION OF THE DRAWINGS

FIG. 11 is a flow chart showing a 3D shape measuring process in the 3D shape measuring system, FIGS. 16A to 16C are diagrams showing the measuring operation in the case where the 3D digitizer has a rotary construction.

DESCRIPTION OF THE PREFERRED EMBODIMENTS

Figure 1:
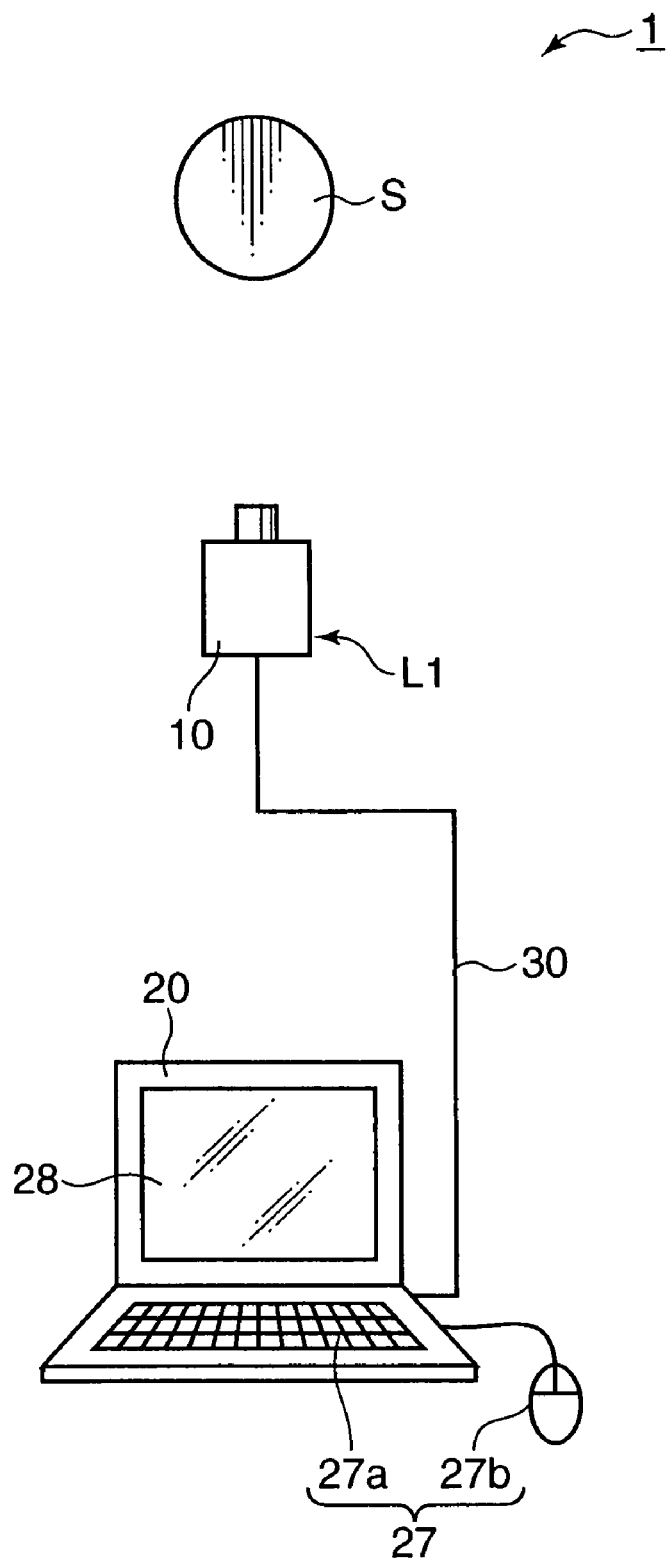
FIG. 1 is a diagram showing the entire construction of a first embodiment of a 3D shape measuring system according to the invention.

Hereinafter, embodiments of a 3D shape measuring system according to the present invention are described. FIG. 1 is a diagram showing the entire construction of a first embodiment of the 3D shape measuring system according to the present invention. As shown in FIG. 1, the 3D shape measuring system 1 is constructed such that a 3D digitizer 10 and a personal computer 20 can communicate with each other through communication link 30. The 3D digitizer 10 performs shape measuring operations for a measurement object S to have the shape thereof measured in a noncontact manner at a plurality of measurement positions around this measurement object S and measures the overall 3D shape of the measurement object S using measurement data representing a plurality of fragmentary 3D shapes obtained by the respective measuring operations.

Figure 2:
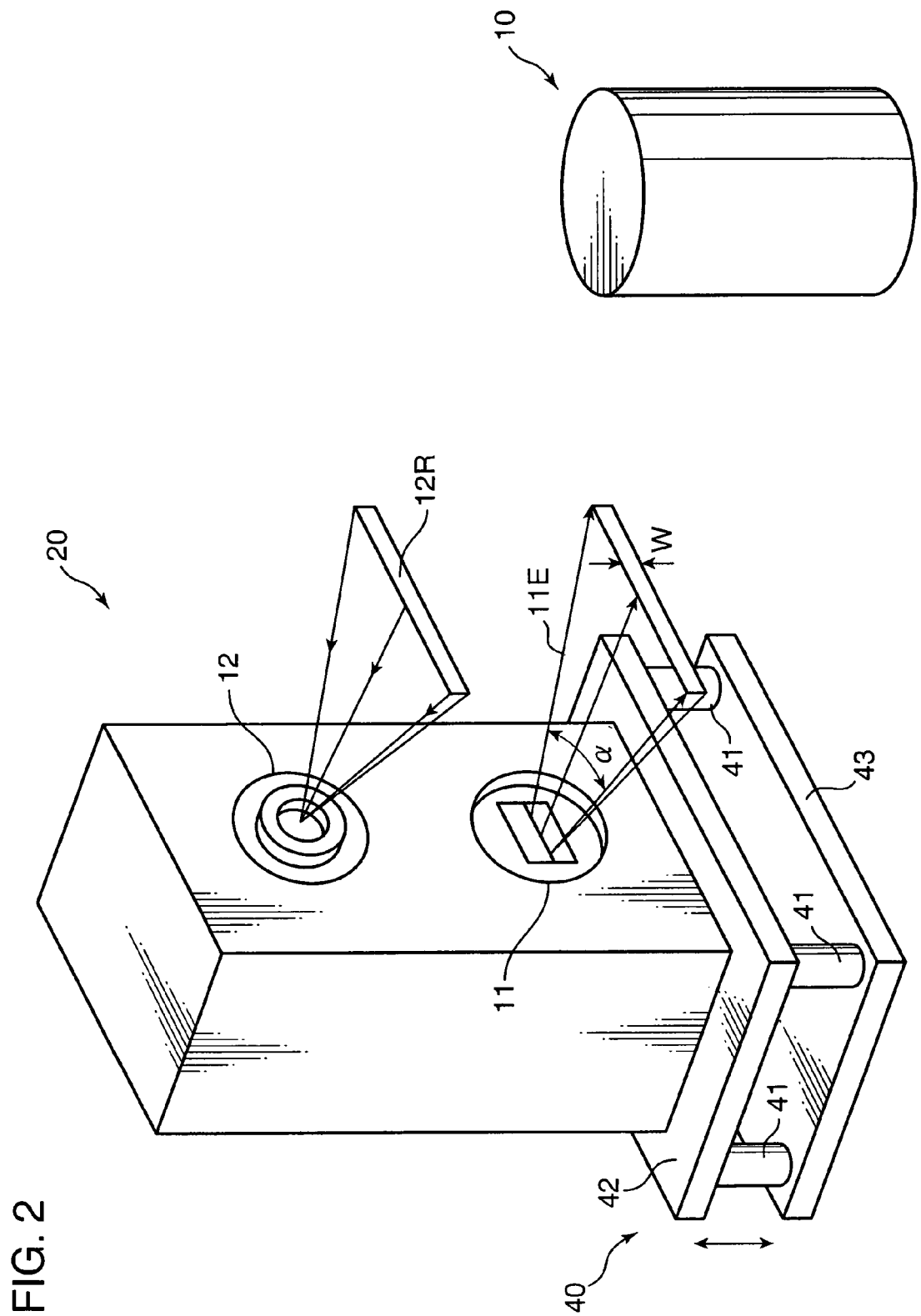
FIG. 2 is a perspective diagram showing light projecting and receiving operations by a 3D digitizer.

FIG. 2 is a diagram showing light projecting and receiving operations of the 3D digitizer 10. The 3D digitizer 10 is for obtaining the 3D data of the measurement object S using a so-called light-section method. This 3D digitizer 10 is constructed such that a light projector 11 with a light projecting window and a light receiver 12 with a light receiving window are arranged in a housing substantially in the form of a rectangular parallelepiped having an optical unit including specified light emitting means and light receiving means built therein. The light projector 11 is disposed above the light receiver 12 at a specified distance therefrom corresponding to a base length.

A slit light 11E as a laser light spreading in a horizontal direction is emitted from the light projector 11. This slit light 11E is a light spreading in the horizontal direction at an emission angle a (fan-shaped) and having a width (thickness) W in a vertical direction. The slit light 11E is emitted toward the measurement object S. In this embodiment, the width W of this slit light 11E has, for example, a length of five pixels of an image sensing device 122 to be described later. The slit light 11E is reflected by the surface of the measurement object S and a part of its reflected light is incident on the light receiver 12.

Figure 3:
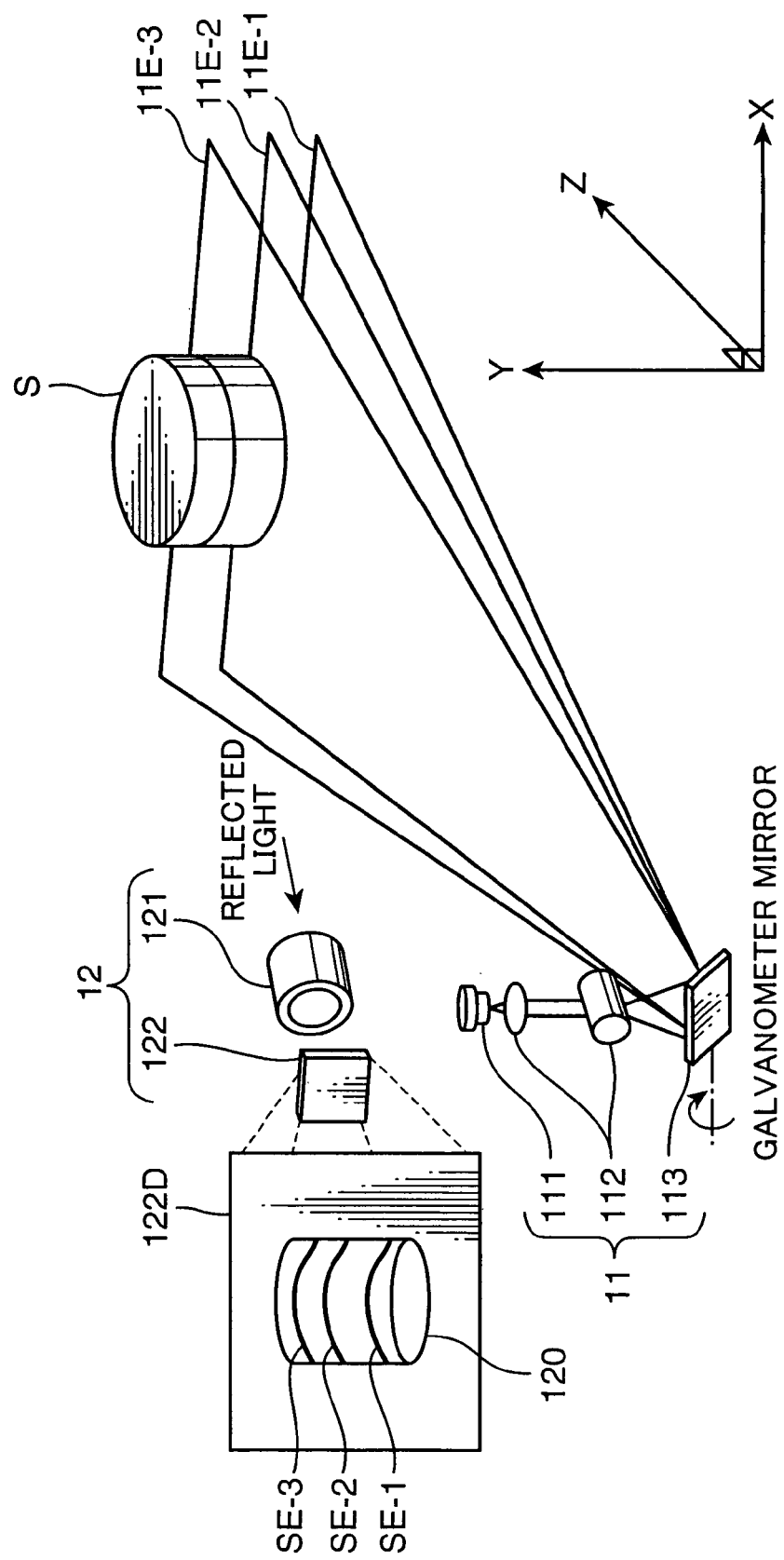
FIG. 3 is a diagram showing a basic internal construction of the 3D digitizer.
Figure 4:
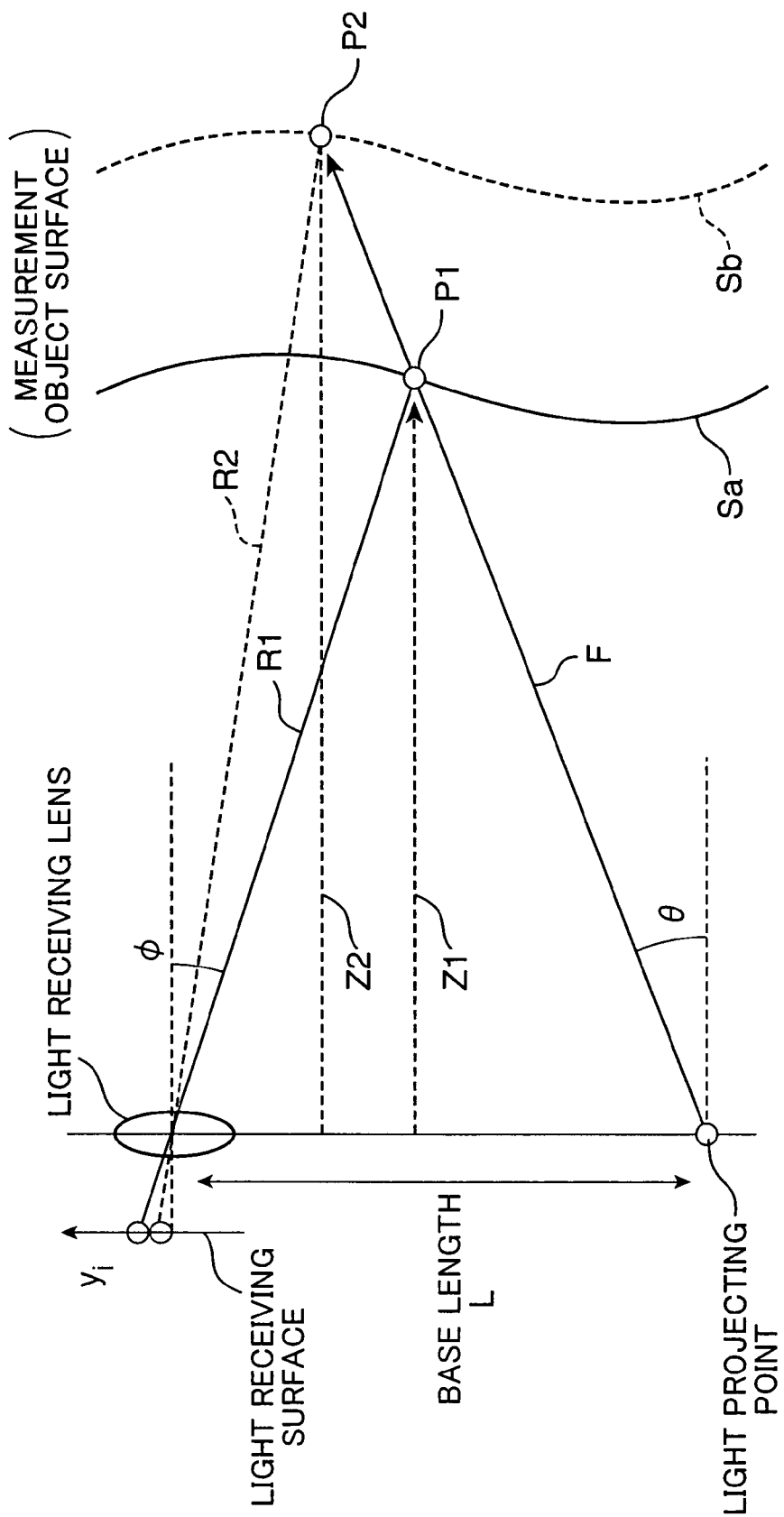
FIG. 4 is a chart showing the principle of a 3D measuring method by the 3D digitizer.

FIG. 3 is a diagram showing a basic internal construction of the 3D digitizer 10, and FIG. 4 is a chart showing the principle of a 3D measuring method by the 3D digitizer 10.

As shown in FIG. 3, the light projector 11 includes a laser light source 111 as a light source for generating a laser light, a projecting optical system 112 for introducing the laser light to the light projecting window, and a galvanometer mirror 113 rotatable in a plane. Further, the light receiver 12 includes a receiving optical system 121 on which a reflected light is incident, and the image sensing device 122 comprised of CCDs (charge-coupled devices) arranged on a light path of the receiving optical system 121.

Slit lights 11E-1, 11E-2 and 11E-3 are successively projected toward the measurement object S from the light projector 111 while the galvanometer mirror 113 is rotated at specified galvanometer's rotation angle. Such light projection is performed to scan the entire area of the measurement object S. The reflected lights at this time are sensed by the image sensing device 122 via the receiving optical system 121. The receiving optical system 121 includes a focusing optical system 1211 (see FIG. 5) for focus adjustment, and the focus adjustment is performed by driving this focusing optical system 1211 in an optical axis direction.

An image 122D sensed by the image sensing device 122 includes slit images SE-1, SE-2 and SE-3 corresponding to the solid shape of the measurement object S. A distance from the 3D digitizer 10 to the measurement object S is calculated based on the triangulation principle from light projection angles of the slit lights 11E-1, 11E-2 and 11E-3 and the positions of the slit images SE-1, SE-2 and SE-3 in a light receiving area of the image sensing device 122 by a measurement data deriving unit 17 (see FIG. 5).

A measurement principle is described with reference to FIG. 4. A light projection angle θ of a laser light F from a light projection point can be obtained from the galvanometer's rotation angle of the galvanometer mirror 113. If it is assumed that the laser light F is reflected at a point P1 on a certain measurement surface Sa and its reflected light R1 is incident on the light receiver 12, a light receiving angle φ of the reflected light R1 is calculated from an image position yi of the reflected light R1 detected on a light receiving surface of the image sensing device 122. Then, a distance Z1 to the point P1 on the measurement surface is calculated from a base line L between the light projecting point and the light receiving point, the light projection angle θ and the light receiving angle φ. This similarly applies to a reflected light R2 reflected at a point P2 on another measurement surface Sb. In this case, a distance Z2 is calculated. The distances calculated for the respective parts of the measurement object S are converted into coordinates (positions) in a common 3D coordinate system, and measurement data representing the coordinates are generated from data representing the above distances.

Referring back to FIG. 1, the personal computer 20 is for retrieving the measurement data obtained by the 3D digitizer 10 and performing various calculations to obtain the 3D shape of the measurement object S. Further, the personal computer 20 includes an input unit 27 such as a keyboard 27a and a mouse 27b used to input a desired instruction, and a display unit 28 for displaying a specified screen.

Figure 5:
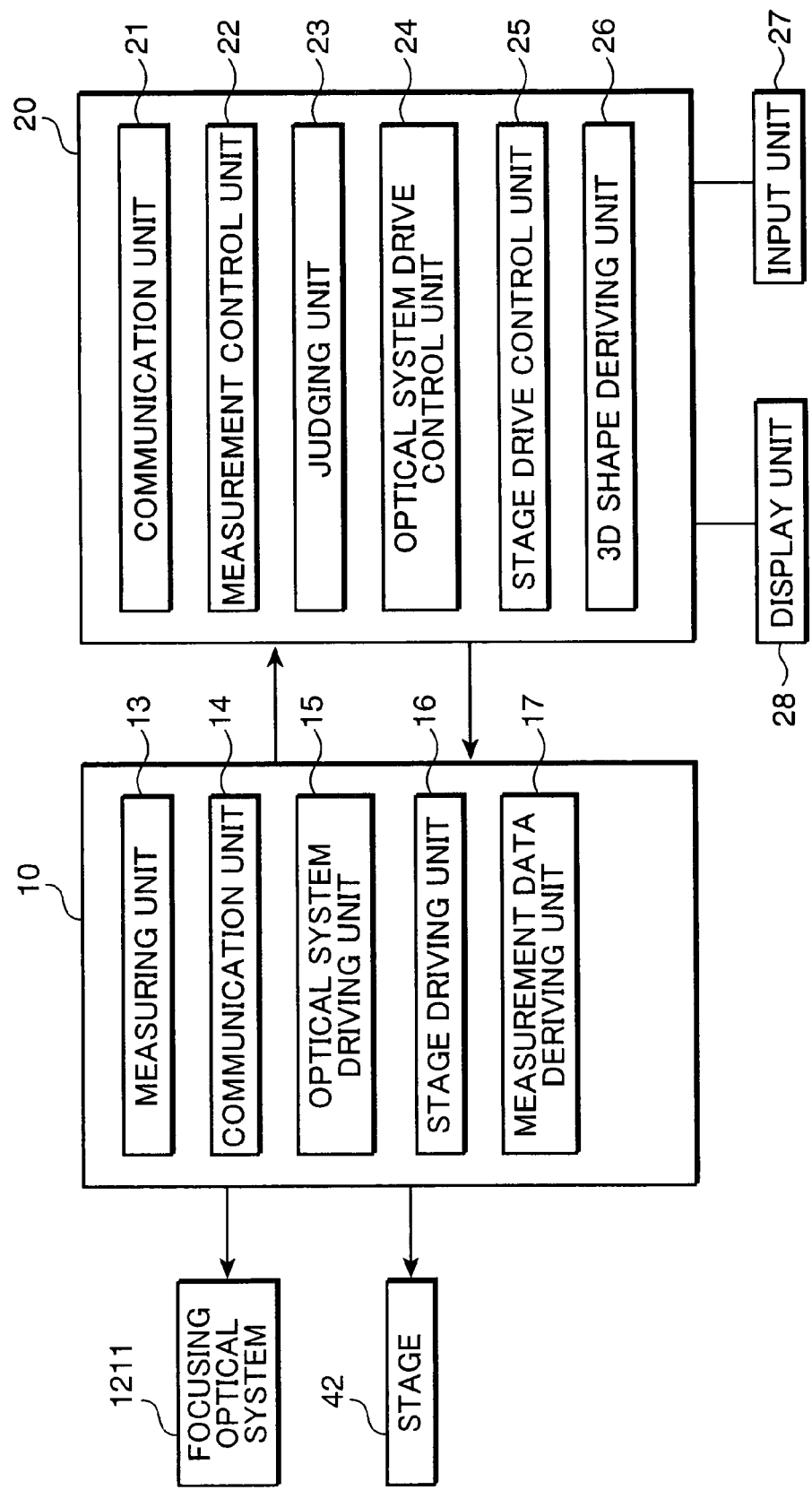
FIG. 5 is a block diagram showing the electrical construction of the 3D shape measuring system.

FIG. 5 is a block diagram showing the construction of the 3D shape measuring system 1. As shown in FIG. 5, the 3D digitizer 10 is provided with a measuring unit 13 including the light projector 11 and the light receiver 12, a communication unit 14 for the communication of various data with the personal computer 20, an optical system driving unit 15 for driving the focusing optical system 1211 in the optical axis direction, a stage driving unit 16 for driving a stage 42 to be described later and the measurement data deriving unit 17.

The communication unit 14 transfers various data to and from the personal computer 20. The communication unit 14 transmits measurement data obtained by the measuring operations at the respective measurement positions by the 3D digitizer 10 to the personal computer 20 and receives data representing an instruction to start/end a measurement by the measuring unit 13, an instruction to change a focal length of the focusing optical system 1211 and an instruction to drive the stage 42 from the personal computer 20.

The optical system driving unit 15 changes the focal length of the focusing optical system 1211 by driving the focusing optical system 1211 in the optical axis direction in accordance with an instruction from the personal computer 20.

The stage driving unit 16 is for changing the position of the measuring unit 13 relative to the measurement object S. In this embodiment, if a gravity direction and its opposite direction are Y-axis directions as shown in FIG. 3, the measuring unit 13 of the 3D digitizer 10 is constructed to be movable in the Y-axis directions by an elevating mechanism 40 as described later. In the following description, it is assumed that a 3D coordinate system is set in which directions representing a distance from the 3D digitizer 10 to the measurement object S are Z-axis directions and directions normal to the Y-axis and Z-axis directions are x-axis directions.

The elevating mechanism 40 includes, for example, hydraulic pistons 41, the stage 42 mounted at the upper ends of the pistons 41, and a supporting surface 43 supporting the pistons 41. The elevating mechanism 40 changes the position of the measuring unit 13 relative to the measurement object S in the Y-axis direction by vertically driving the stage 42 having the measuring unit 13 placed thereon utilizing upward and downward movements of the pistons 41.

The measurement data deriving unit 17 is for calculating the distance from the 3D digitizer 10 to the shape measurement object S by the triangulation principle as described above.

The personal computer 20 is functionally provided with a communication unit 21 for the communication of various data with the 3D digitizer 10, a measurement control unit 22, a judging unit 23, an optical system drive control unit 24 (part of a measurement range shifting unit), a stage drive control unit 25 (part of the measurement range shifting unit) and a 3D shape deriving unit 26 (shape calculating unit) to be described below.

The measurement control unit 22 is for causing the light projector 11 and the light receiver 12 of the 3D digitizer 10 to perform light projecting and receiving operations.

The judging unit 23 is for obtaining a measurement data derived this time by means of the measurement data deriving unit 17 from the 3D digitizer 10 via the communication unit 21 and judging the presence or absence of any unmeasured area of the measurement object outside the measurement range of the measuring operation this time using the measurement data. Hereinafter, this judging method is described.

Figure 6:
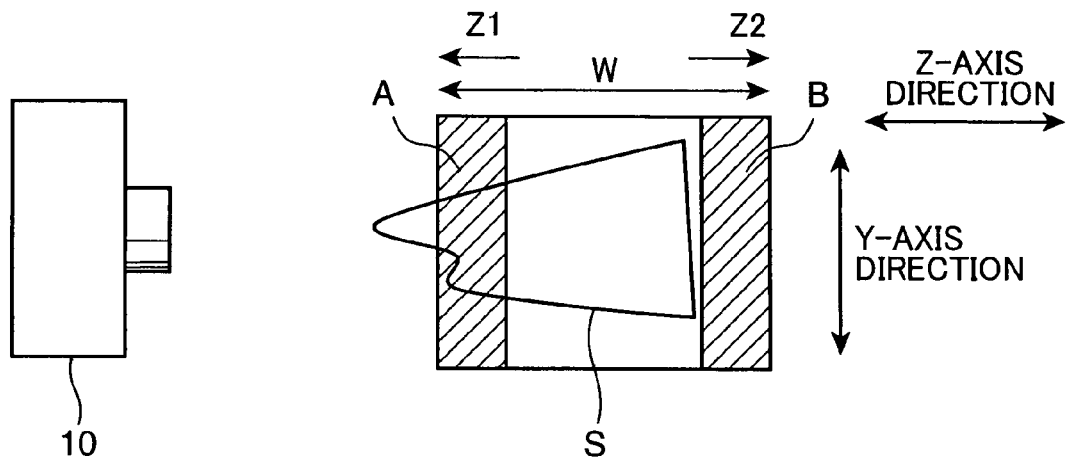
FIGS. 6, 7 are diagrams showing the contour of a certain shape measurement object when the measurement object is viewed in an X-axis direction and a measurement range of the 3D digitizer.
Figure 7:
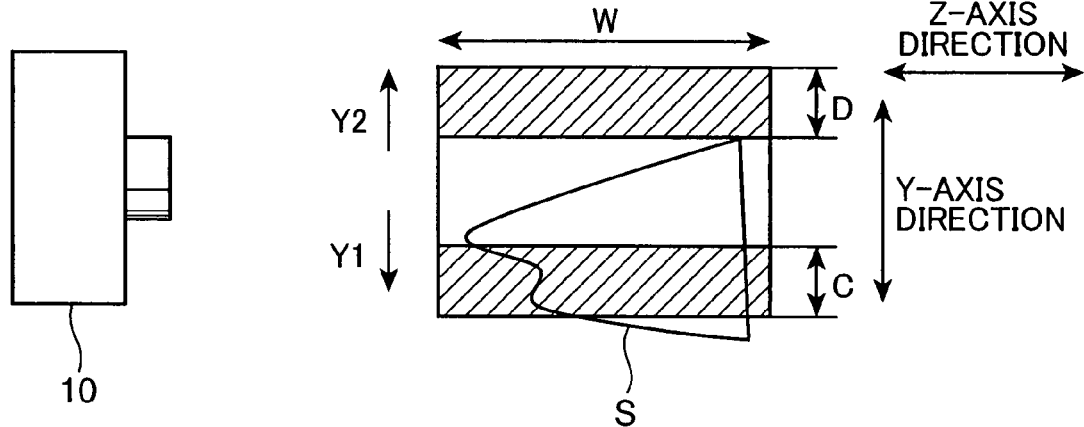

FIGS. 6 and 7 are diagrams showing the contour of a certain measurement object S when viewed in the X-axis direction, and the measurement range of the 3D digitizer 10. Here, there exists a specified zone, i.e., a depth of focus, before and after the focus position in the optical axis direction of the focusing optical system 1211. In the depth of focus, an in-focus condition is assumed to be substantially attained. The 3D digitizer 10 can measure the surface shape while being substantially focused on a surface portion of the measurement object S belonging to this depth of focus.

In FIGS. 6 and 7, a range indicated by arrows W is the depth of focus, and a distance to the 3D digitizer 10 is calculated, i.e. a measurement data is obtained with an in-focus condition substantially attained for a region of the surface area of the measurement object S included in the depth of focus W. Accordingly, the depth of focus W when the focusing optical system 1211 is set at a certain focal length corresponds to a measurement range in the Z-axis direction when a certain slit light 11E is emitted toward the measurement object S, and the position of the measurement object S in the Z-axis direction can be changed by changing the focal length of the focusing optical system 1211.

On the other hand, a shift of the measurement range in the Y-axis direction can be realized by elevating or lowering the stage 42 to vertically move the 3D digitizer 10. Although the measurement range is shifted only in the Y-axis directions and Z-axis directions in this embodiment, it may be also shifted in the X-axis directions.

The judging unit 23 judges whether or not any measurement data exists in areas of a specified size (hereinafter, "judgment areas") located at the opposite ends (specified peripheral part as claimed) of the measurement range in the Z-axis direction out of the measurement data obtained by the measuring operation of the 3D digitizer 10 this time if attention is paid to the Z-axis direction (first direction). The judging unit 23 judges that a measurement needs to be made with the focal length changed such that the measurement range will be shifted in a direction from another judgment area to this judgment area if the measurement data is judged to exist in the judgment area. On the other hand, the judging unit 23 judges that no measurement needs to be made with the focal length changed if no measurement data is judged to exist in the judgment area.

For example, the surface area of the measurement object S is included in the judgment area A and a measurement data is obtained from the judgment area A in FIG. 6. In this case, a part of the measurement object S exists outside (on the left side in FIG. 6) of the judgment area A in the Z-axis direction and it can be assumed that an unmeasured surface area of the measurement object S exists. Accordingly, the judging unit 23 judges that a measurement needs to be made with the focal length changed such that the measurement range will be shifted in a direction from the other judgment area B toward the judgment area A, i.e. in a direction of arrow Z1.

On the other hand, the surface of the measurement object S is not included in the judgment area B at all and no measurement data can be obtained from the judgment area B. In this case, no part of the measurement object S exists outside (on the right side in FIG. 6) of the judgment area B in the Z-axis direction and it can be assumed that no unmeasured surface area exists. Accordingly, the judging unit 23 judges that no measurement needs to be made with the focal length changed such that the measurement range will be shifted in the direction from the other judgment area A toward the judgment area B, i.e. in a direction of arrow Z2.

Similar to this, the judging unit 23 judges whether or not any measurement data exists in judgment areas of a specified size located at the opposite ends of the measurement range in the Y-axis direction out of the measurement data obtained by the measuring operation of the 3D digitizer 10 this time if attention is paid to the Y-axis direction (second direction). The judging unit 23 judges that a measurement needs to be made with the measurement range shifted in a direction from another judgment area to this judgment area if the measurement data is judged to exist in the judgment area while judging that no measurement needs to be made with the measurement range shifted if no measurement data is judged to exist in the judgment area.

For example, the surface area of the measurement object S is included in a judgment area C and a measurement data is obtained from the judgment area C in FIG. 7. In this case, a part of the measurement object S exists outside (at the lower side in FIG. 7) of the judgment area C in the Y-axis direction and it can be assumed that an unmeasured surface area of the measurement object S exists. Accordingly, the judging unit 23 judges that a measurement needs to be made with the measurement range shifted in a direction from another judgment area D toward the judgment area C, i.e. in a direction of arrow Y1.

On the other hand, the surface of the measurement object S is not included in the judgment area D at all and no measurement data can be obtained from the judgment area D. In this case, no part of the measurement object S exists outside (at the upper side in FIG. 7) of the judgment area D in the Y-axis direction and it can be assumed that no unmeasured surface area exists. Accordingly, the judging unit 23 judges that no measurement needs to be made with the measurement range shifted in a direction from the other judgment area C toward the judgment area D, i.e. in a direction of arrow Y2.

The optical system drive control unit 24 is for outputting an instruction to drive the focusing optical system 1211 in the optical axis direction to the optical system driving unit 15 of the 3D digitizer 10 if the judging unit 23 judges that a measurement needs to be made with the measurement range shifted in the Z-axis direction.

Figure 8A:
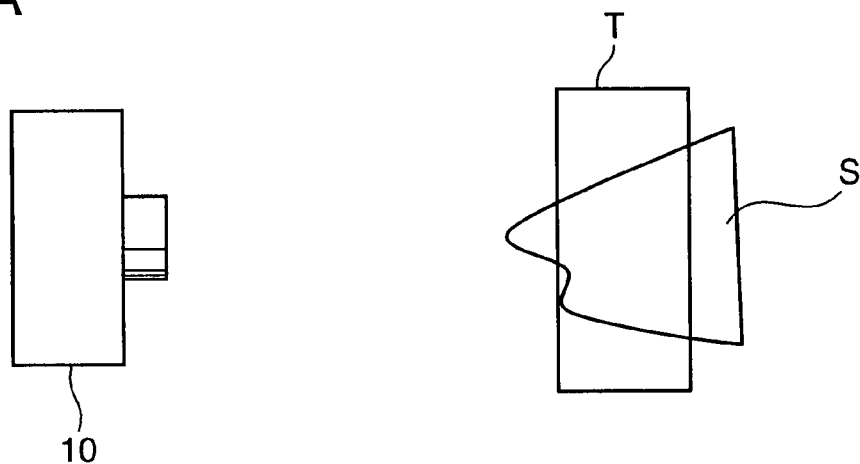
FIGS. 8A to 8C are diagrams showing shifts of the measurement range in a Z-axis direction.
Figure 8B:
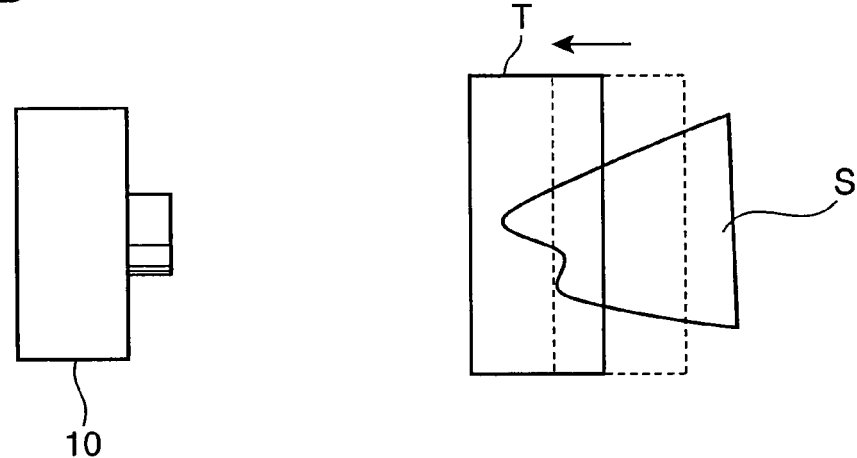

For example, it is assumed that the present position of a measurement range T relative to the measurement object S in the Z-axis direction (first direction) is a position shown in FIG. 8A and the judging unit 23 judges that a measurement needs to be made at a position more toward the 3D digitizer 10 than the present position of the measurement range T. If this case is applied to the above example, the optical system drive control unit 24 outputs an instruction to drive the focusing optical system 1211 to shift the measurement range T to the position toward the 3D digitizer 10 from the present position (shorten the focal length) as shown in FIG. 8B to the optical system driving unit 15 if a measurement data exists in the judgment area A in FIG. 6 and it is judged that a measurement needs to be made with the focal length changed in such a manner that the measurement range is shifted in the direction of arrow Z1.

Figure 8C:
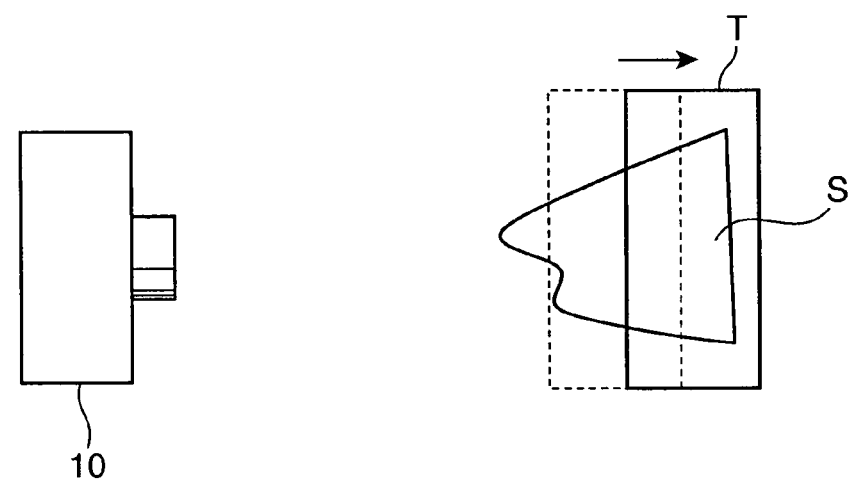

On the other hand, if it is judged that a measurement needs to be made at a side away from the 3D digitizer 10 from the present position of the measurement range T, the optical system drive control unit 24 outputs an instruction to drive the focusing optical system 1211 to shift the measurement range toward the side away from the 3D digitizer 10 from the present position (extend the focal length) as shown in FIG. 8C. It should be noted that dotted lines in FIGS. 8B and 8C show positions of the measurement range T shown in FIG. 8A.

The stage drive control unit 25 outputs an instruction to move the stage 42 upward or downward to the stage driving unit 16 of the 3D digitizer 10 if the judging unit 23 judges that a measurement needs to be made with the measurement range T shifted in the Y-axis direction.

Figure 9A:
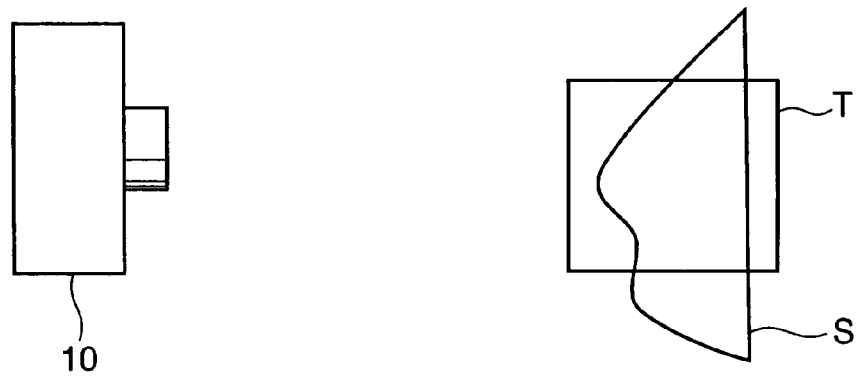
FIGS. 9A to 9C are diagrams showing shifts of the measurement range in a Y-axis direction.
Figure 9B:
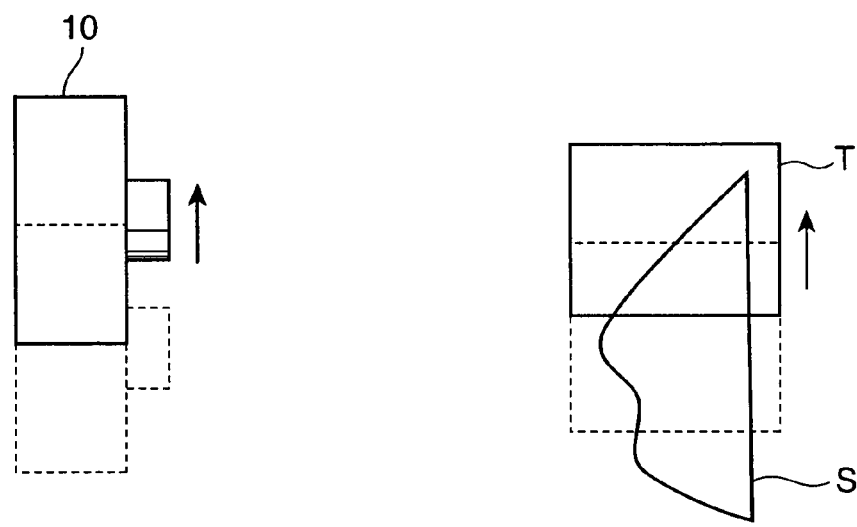

For example, it is assumed that the present position of the measurement range T relative to the measurement object S in the Y-axis direction (second direction) is a position shown in FIG. 9A and the judging unit 23 judges that a measurement needs to be made at a position lower than the present position of the measurement range T in the Y-axis direction. If this case is applied to the above example, the stage drive control unit 25 outputs an instruction to drive the stage 42 to shift the measurement range T to a position lower than the present position in the Y-axis direction as shown in FIG. 9B to the stage driving unit 16 if a measurement data exists in the judgment area C in FIG. 7 and it is judged that a measurement needs to be made with the measurement range shifted in the direction of arrow Y1.

Figure 9C:
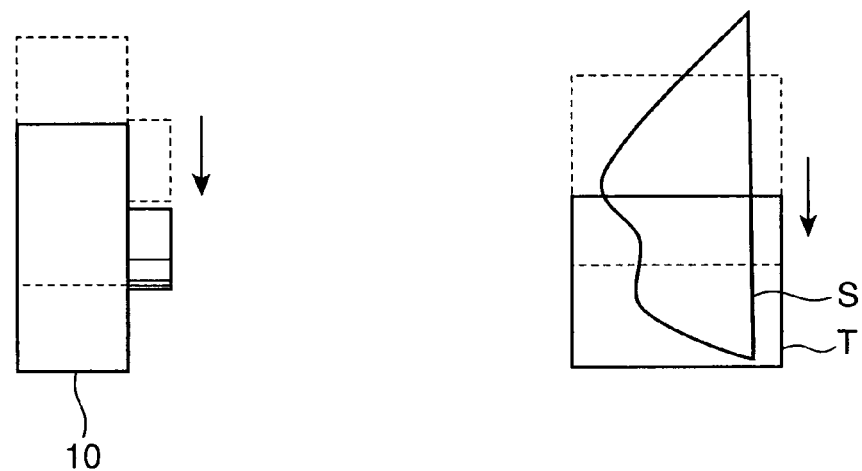

On the other hand, if it is judged that a measurement needs to be made at a position higher than the present position of the measurement range T, the stage drive control unit 25 outputs an instruction to drive the stage 42 to shift the measurement range to the position higher than present position in the Y-axis direction as shown in FIG. 9C. It should be noted that dotted lines in FIGS. 9B and 9C show positions of the 3D digitizer 10 and the measurement range T shown in FIG. 9A.

The judging unit 23, the optical system drive control unit 24 and the stage drive control unit 25 repeatedly perform the above operations until the 3D shape of the measurement object S is completely measured.

Figure 10A:
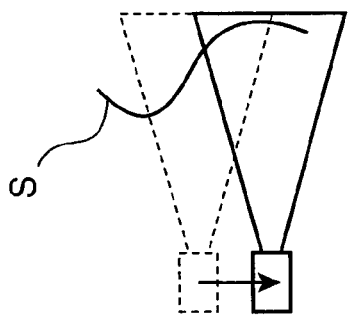
FIGS. 10A to 10D are diagrams showing a measuring operation performed for the measurement object.

For example, in the case of measuring the 3D shape of a measurement object S having a surface shape as shown in FIG. 10A, it is assumed that the focal length of the focusing optical system 1211 and the position of the 3D digitizer 10 in the Y-axis direction are initially set such that a measurement range includes, for example, an upper end part of the S-shaped surface area of the measurement object S.

At this time, in a state shown in FIG. 10A, the judging unit 23 judges the presence of an unmeasured area at the lower side of the measurement range in the Y-axis direction based on the aforementioned judging method. The stage drive control unit 25 lowers the 3D digitizer in the Y-axis direction as shown in FIG. 10B based on this judgment result.

Figure 10B:
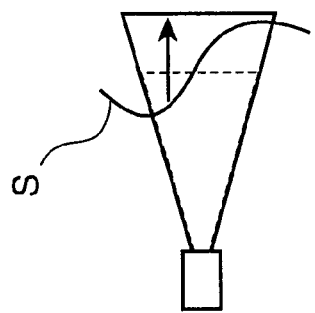
Figure 10C:
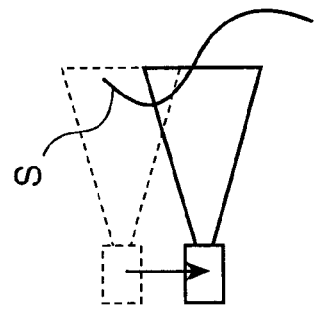

In a state shown in FIG. 10B, the judging unit 23 judges the presence of an unmeasured area at the right side of the measurement range. Based on this judgment result, the optical system drive control unit 24 increases the focal length of the focusing optical system 1211 so as to shift the measurement range to the right in the Z-axis direction as shown in FIG. 10C. Although the presence of an unmeasured area at the upper side of the measurement range in the Y-axis direction is judged in the state shown in FIG. 10B, this area is already measured in the state shown in FIG. 10A and, therefore, not measured again. Similarly, no measurement is made for the already measured area in the following operations.

Figure 10D:
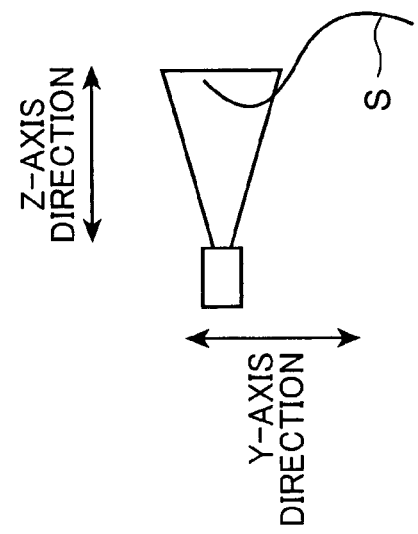

In a state shown in FIG. 10C, the judging unit 23 judges the presence of an unmeasured area at the lower side of the measurement range in the Y-axis direction. Based on this judgment result, the stage drive control unit 25 lowers the 3D digitizer 10 in the Y-axis direction as shown in FIG. 10D. In a state shown in FIG. 10D, it is judged that no unmeasured area exists outside the measurement range either in the Y-axis direction or in the Z-axis direction, thereby completing the operation of measuring the 3D shape of the measurement object S.

The 3D shape deriving unit 26 calculates to derive the overall 3D shape of the measurement object S based on a plurality of measurement data obtained by the measuring operations performed thus far when the operation of measuring the 3D shape of the measurement object S by the 3D digitizer 10 is completed.

FIG. 11 is a flow chart showing the 3D shape measuring process in the 3D shape measuring system 1. It should be noted that the measuring operations in only one of the Y-axis and Z-axis directions are premised to simplify the description in FIG. 11.

As shown in FIG. 11, when the 3D digitizer 10 performs a measuring operation in a certain measurement range for a measurement object S (Step #1), the personal computer 20 judges the presence or absence of any unmeasured area outside the measurement range in this measuring operation using measurement data obtained by this measuring operation (Step #2). In the case of the presence (YES in Step #2), the personal computer 20 causes the 3D digitizer 10 to perform a measuring operation by returning to Step #1 after shifting the position of the measurement range outward (Step #3).

The 3D digitizer 10 finishes the measuring operation for the measurement object S if the personal computer 20 judges the absence of the unmeasured area outside the measurement range in Step #2 (NO in Step #2).

As described above, the presence or absence of any unmeasured area outside the present measurement range is judged from the measurement data obtained by the measuring operation by the measuring unit 13, and the measuring operation is performed after shifting the measurement range to an outside area if the presence of any unmeasured area is judged. Thus, the measuring operation can be performed by automatically shifting the measurement range of the measuring unit 13. Accordingly, unlike the prior art, an operator himself needs not judge the presence or absence of any unmeasured surface area outside the present measurement range and make judgment on the destination of the 3D digitizer 10. As a result, labor and time required for the operation can be saved, thereby shortening the measurement time.

The present invention embraces the following modifications in addition to or instead of the above embodiment.

(1) In the first embodiment, the judgment areas are defined in the measurement range, and whether or not there is any unmeasured surface area outside the judgment areas, i.e. whether or not the present measurement range needs to be shifted is judged based on the presence or absence of the measurement data in these judgment areas. The present invention is not limited to this and, for example, a judging method as below can also be adopted.

Figure 12:
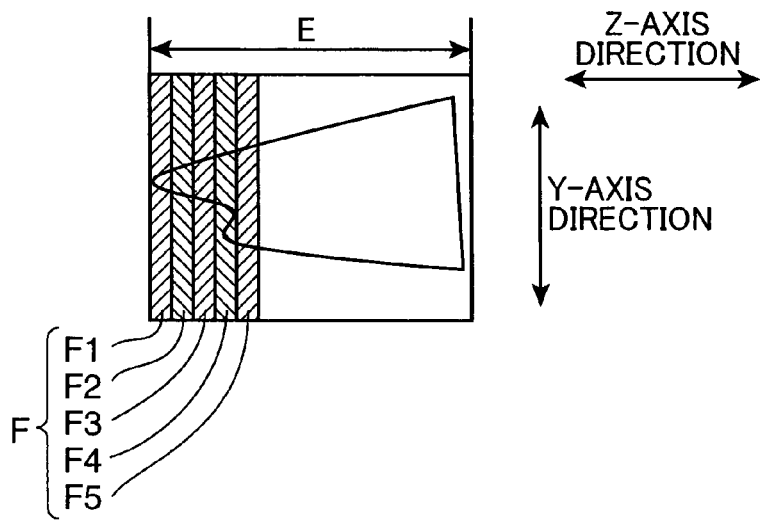
FIGS. 12, 13A, 13B, 14, 15A and 15B are diagrams showing another judging method as to the presence or absence of an unmeasured area.

It is now assumed that the positional relationship between a measurement object S and a present measurement range E is as shown in FIG. 12 and it is judged whether or not the measurement range E needs to be shifted, for example, in the Z-axis direction in this state.

In this case, the judging unit 23 of this embodiment sets a judgment area F similar to the one of the first embodiment on a peripheral part of the measurement range E, divides this judgment area F into a specified number of blocks F1 to F5 in the Z-axis direction and detects the number of measurement data (data number) in each of the blocks F1 to F5.

Figure 13A:
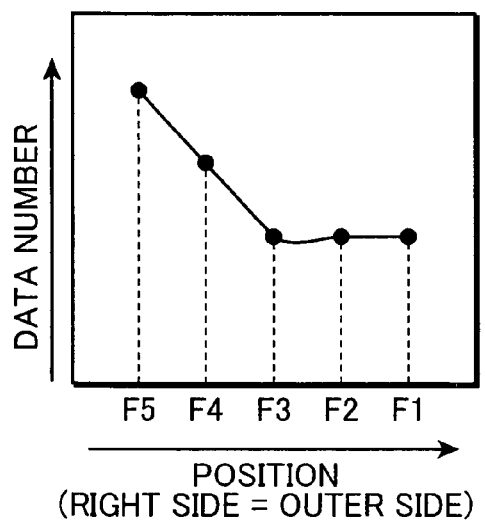
Figure 13B:
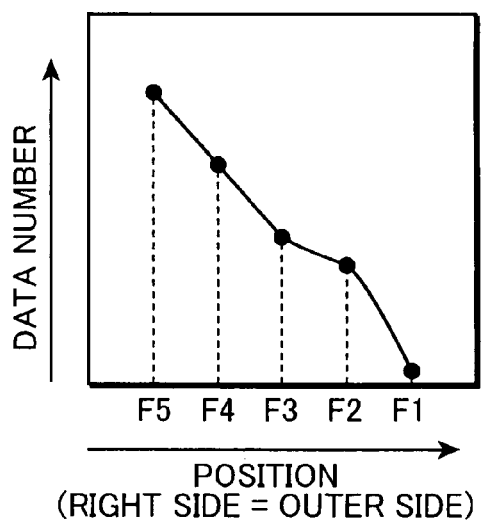

FIGS. 13A and 13B are graphs showing distribution examples of the numbers of measurement data belonging to the respective blocks F1 to F5, wherein horizontal axis represents the positions of the blocks (right side of the horizontal axis corresponds to the outer side (left side in FIG. 12) of the judgment area F in the Z-axis direction) and vertical axis represents the numbers of the measurement data belonging to the respective blocks F1 to F5.

When attention is paid to a change in the data number in a direction from the inner block F5 toward the outer block F1, the data number decreases up to the intermediate block F3, but is substantially constant from the block F3 to the block F5 in the example shown in FIG. 13A. In this case, it can be judged that the measurement object S is present outside the outermost block F1 in the Z-axis direction and, therefore, an unmeasured surface area exists.

On the other hand, in the example shown in FIG. 13B, the data number gradually decreases in the direction from the inner block F5 toward the outer block F1, and hardly any measurement data exists in the outermost block F1. In this case, it can be judged that the measurement object S is not present outside the outermost block F1 in the Z-axis direction and, therefore, no unmeasured surface area exists.

Based on such judging criteria, the judging unit 23 causes the position of the measurement range E to be shifted to the outer side (left side) from the present position of the measurement range shown in FIG. 12 similar to the first embodiment if a change of the data number in the direction from the inner block F5 toward the outer block F1 is as shown in FIG. 13A. On the other hand, the judging unit 23 does not cause the position of the measurement range E to be shifted if a data number distribution as shown in FIG. 13B is obtained.

Figure 14:
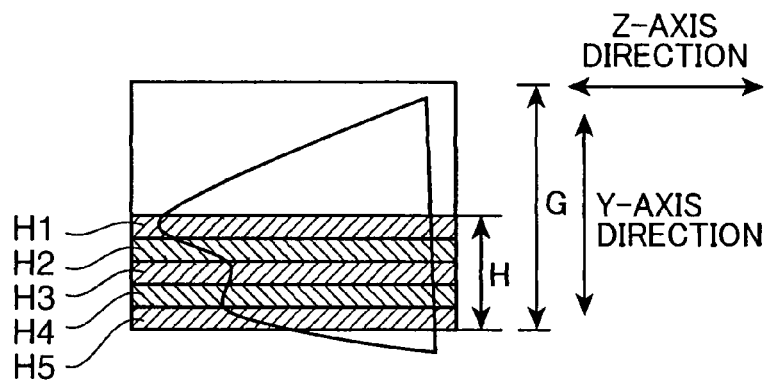

The judging unit 23 of this embodiment makes judgments by a judging method substantially similar to the above for the Y-axis direction. It is now assumed that the positional relationship between a measurement object S and a present measurement range G is, for example, as shown in FIG. 14 and it is judged whether or not the measurement range G needs to be shifted, for example, in the Y-axis direction in this state.

In this case, the judging unit 23 of this embodiment sets a judgment area H similar to the one of the first embodiment on a peripheral part of the measurement range G, divides this judgment area H into a specified number of blocks H1 to H5 in the Y-axis direction and detects the number of measurement data (data number) in each of the blocks H1 to H5.

Figure 15A:
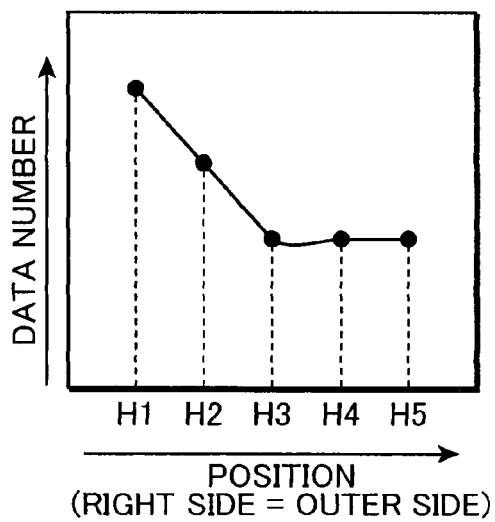
Figure 15B:
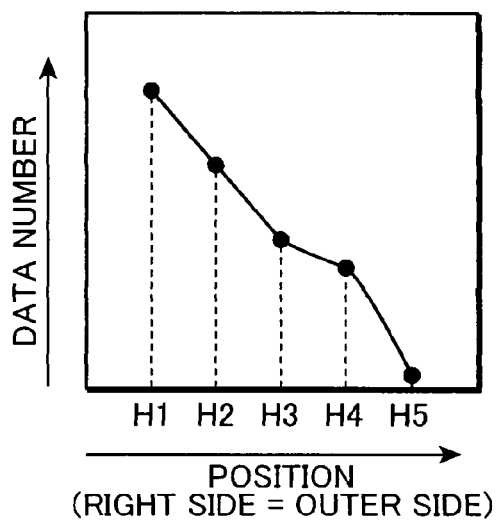

FIGS. 15A and 15B are graphs showing distribution examples of the numbers of measurement data belonging to the respective blocks H1 to H5, wherein horizontal axis represents the positions of the blocks (right side of the horizontal axis corresponds to the outer side (lower side in FIG. 14) of the judgment area H in the Y-axis direction) and vertical axis represents the numbers of the measurement data belonging to the respective blocks H1 to H5.

When attention is paid to a change in the data number in a direction from the inner block H1 toward the outer block H5, the data number decreases up to the intermediate block H3, but is substantially constant from the block H3 to the block H5 in the example shown in FIG. 15A. In this case, it can be judged that the measurement object S is present outside the outermost block H5 in the Y-axis direction and, therefore, an unmeasured surface area exists.

On the other hand, in the example shown in FIG. 15B, the data number gradually decreases in the direction from the inner block H1 toward the outer block H5, and hardly any measurement data exists in the outermost block H5. In this case, it can be judged that the measurement object S is not present outside the outermost block H5 in the Y-axis direction and, therefore, no unmeasured surface area exists.

Accordingly, the judging unit 23 causes the position of the measurement range G to be shifted to the outer side (lower side) from the position shown in FIG. 14 similar to the first embodiment if a change of the data number in the direction from the inner block H1 toward the outer block H5 is as shown in FIG. 15A. On the other hand, the position of the measurement range G is not shifted if a data number distribution as shown in FIG. 15B is obtained.

Differently from this judging method, the presence or absence of any unmeasured surface area outside the peripheral part may be judged based on the inclination of the surface shape derived from the measurement data of the judgment area.

Figure 18:
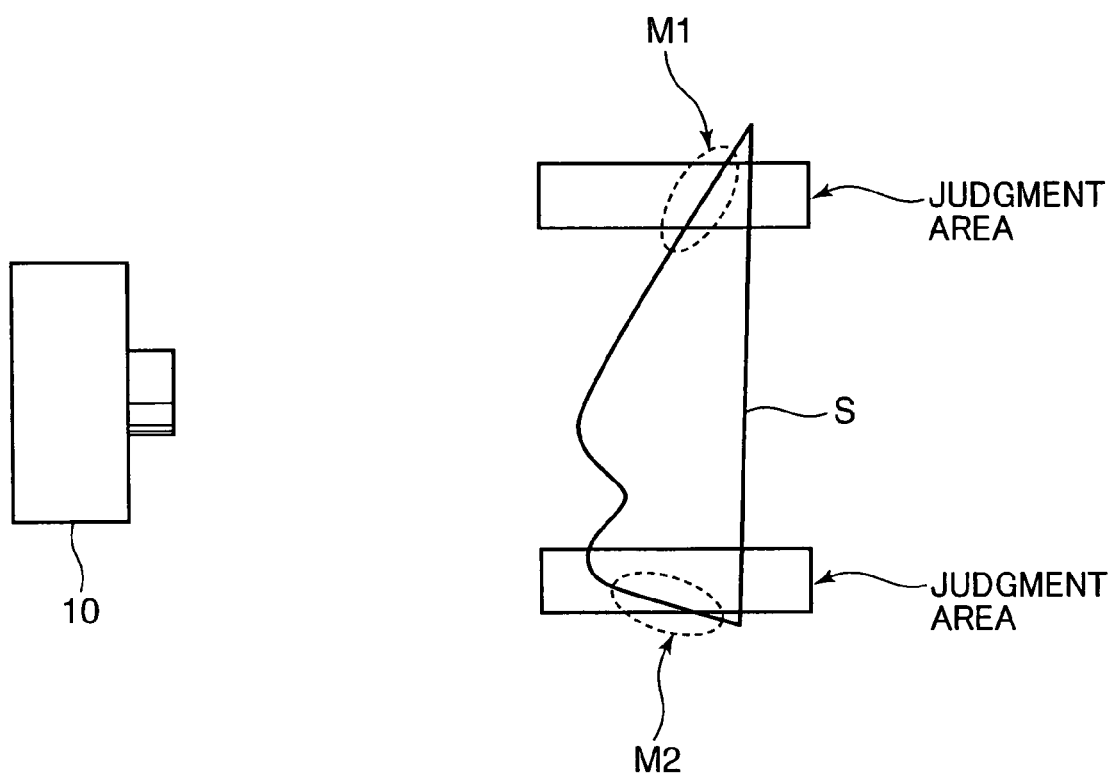
FIG. 18 is a diagram showing another judging method as to the presence or absence of an unmeasured area.

Specifically, the presence of a surface area yet to be measured outside the judgment area can be judged if the inclination of the surface shape derived from the measurement data of the judgment area is moderate as shown by an arrow M1 of FIG. 18. On the other hand, the absence of the unmeasured surface area outside the judgment area can be judged if the inclination of the surface shape is steep as shown by an arrow M2.

(2) If the presence of an unmeasured area outside the present measurement data is judged and the measurement range is shifted by changing the focal length of the focusing optical system 1211 or changing the position of the 3D digitizer 10, the changing pitch of the focal length and the moving pitch of the 3D digitizer 10 in the Y-axis direction may be manually set or automatically set.

In the case of manually setting the moving pitch, the moving pitch can be arbitrarily set. The changing pitch and moving pitch may be set to absolute values such as 1 mm and 1 cm or relative values such as 20% of the size of the measurement data.

A construction for automatically setting the moving pitch may be, for example, such that an equation expressing the surface shape of a measurement object S based on a measurement data in a judgment area is derived, an unmeasured area outside the judgment area is derived based on this equation, and a moving amount of the measurement data necessary to measure this unmeasured area is derived by analogical reasoning. In this way, labor and time required to manually set the moving pitch of the measurement data can be saved, making it possible to shorten the measurement time for measuring the shape measurement object.

(3) In order to prevent or suppress the prolongation of the measuring operation for the shape measurement object, the operator may set an upper limit in the number of measurements performed for one shape measurement object or may set the number of measurements or its upper limit, for example, for each of the Y-axis direction and Z-axis direction. In the case of enabling the number of measurements or its upper limit to be set for each direction, the number of measurements in each direction can be set in conformity with the shape of the shape measurement object.

For example, in the case of measuring the 3D shape of a shape measurement object having substantially equal dimensions in the respective directions, substantially the same numbers of measurements may be set for the respective directions. For example, in the case of measuring the 3D shape of a shape measurement object longer in one direction, a greater number of measurements may be set for the one direction than for the other direction.

In the case of limiting the number of measurements for one shape measurement object as described above, priorities may be set for the respective shifting directions if there are a plurality of shifting directions in which the measurement data should be shifted, and the measurement data may be shifted in accordance with these priorities. Although FIG. 18 is used to describe the mode for judging whether or not the measurement range needs to be shifted based on the inclination of the surface shape derived from the measurement data of the judgment area in the modification (1), FIG. 18 is used here to describe a mode for setting priorities for the shifting directions of the measurement range and shifting the measurement range in accordance with these priorities.

If attention is paid to the Y-axis direction as shown in FIG. 18, it can be thought that a larger area is present outside the judgment area in the Y-axis direction with the more moderate surface shape when the surface shapes included in the two judgment areas are compared.

Thus, a higher priority may be set for the judgment area including the more moderate surface shape and the measuring operation may be performed with the measurement range shifted outward from this judgment area in the Y-axis direction. This enables an efficient measuring operation to obtain more measurement data with a smaller number of measurements. Even if an area should be still left unmeasured by limiting the number of measurements for one shape measurement object, the surface area to be left unmeasured can be suppressed to a minimally small area.

Besides this priority setting method, there can be supposed a method for setting priorities for the judgment areas based on the number of obtained measurement data. For example, a higher priority may be set for the judgment area where more measurement data are obtained out of the two judgment areas, and the measuring operation may be performed with the measurement range shifted outward from this judgment area in the Y-axis direction.

(4) Although the 3D digitizer 10 is constructed to be parallelly movable in one direction (Y-axis direction) by the elevating mechanism 40 in the first embodiment, it may be constructed to be parallelly movable not in one direction, but in a plurality of directions. It is more preferable to construct the 3D digitizer 10 to make a rotary movement (change the facing direction). FIGS. 16A to 16C are diagrams showing measuring operations of the 3D digitizer 10 constructed to be rotationally movable in the case of measuring the shape of the measurement object S shown in FIG. 10.

If the state shown in FIG. 16A is assumed to correspond to the initial state shown in FIG. 10A, the personal computer 20 causes the facing direction of the 3D digitizer 10 (light projecting direction) to be changed on a plane parallel to a Y-Z plane as shown in FIG. 16B. At this time, the personal computer 20 changes the facing direction of the 3D digitizer 10 so that as much surface area of the measurement object as possible can be included in a measurement range after the change, i.e. as many measurement data as possible can be obtained.

In the state shown in FIG. 16B, the judging unit 23 judges the presence of an unmeasured area obliquely below to the right of the measurement range. In response to this judgment, the facing direction of the 3D digitizer 10 is changed in the plane parallel to the Y-Z plane as shown in FIG. 16C similar to the state shown in FIG. 10D. In addition, the optical system drive control unit 24 increases the focal length so as to shift the measurement range to the right in the Z-axis direction.

By changing the facing direction of the 3D digitizer 10 so that as much surface area of the measurement object as possible can be included in the measurement range after the change, three measuring operations are sufficient in this embodiment unlike the first embodiment in which four measuring operations are necessary. Therefore, the number of measurements and consequently the measurement time can be reduced.

(5) If the measurement range needs to be shifted to a position beyond the measurable range of the 3D digitizer 10, the shifting of the measurement range and the measuring operation may be stopped and the 3D digitizer 10 may be returned to the initial position. This can prevent an unnecessary measuring operation for which the measurement range lies beyond the measurable range.

Figure 17:
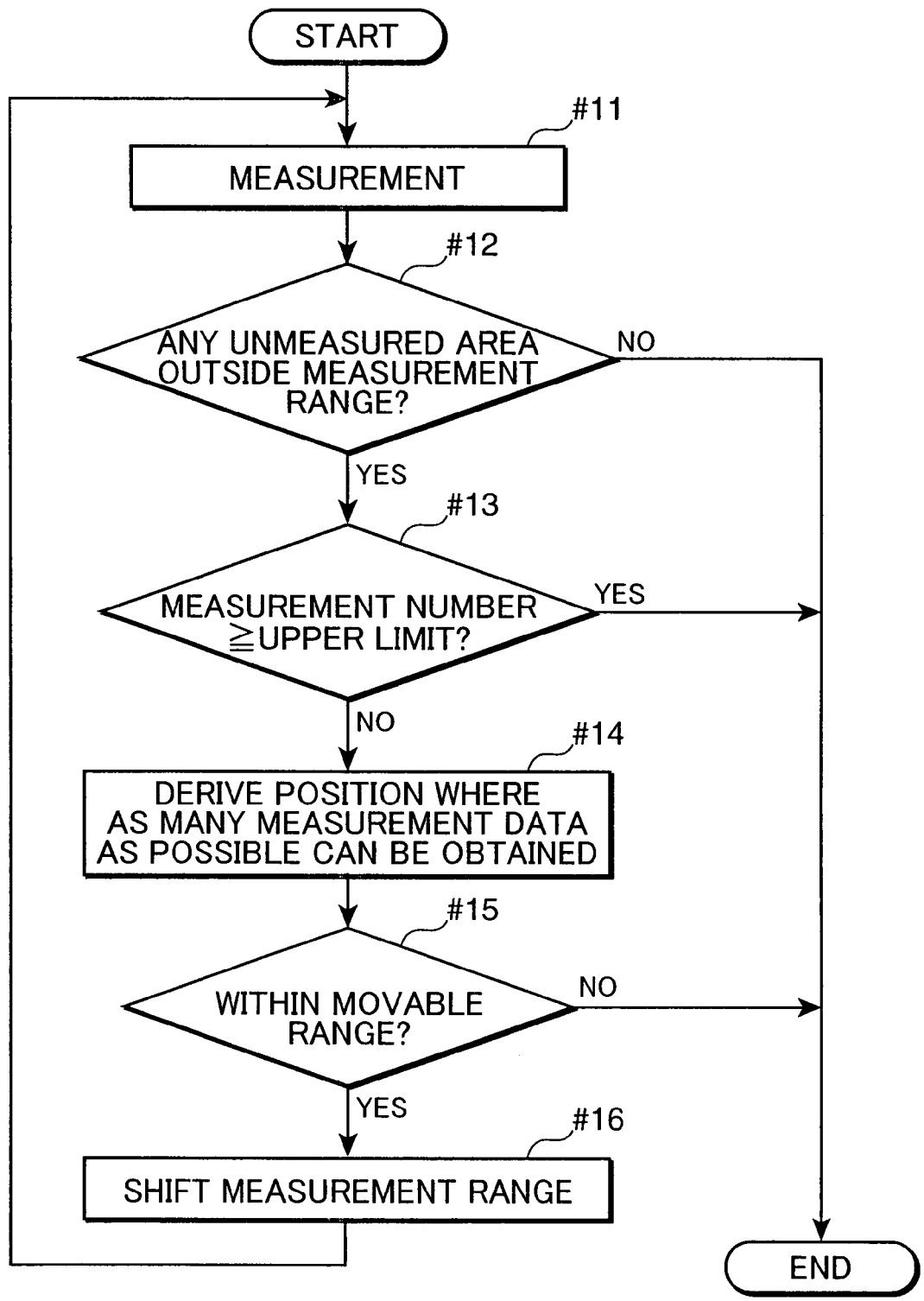
FIG. 17 is a flow chart showing a 3D shape measuring process in the 3D shape measuring system in the case of considering modifications (3) to (5)

FIG. 17 is a flow chart showing the 3D shape measuring process in the 3D shape measuring system 1 in the case where the modifications (3) to (5) are considered.

As shown in FIG. 17, when the 3D digitizer 10 performs a measuring operation in a certain measurement range for a measurement object S (Step #11), the personal computer 20 judges the presence or absence of any unmeasured area outside the measurement range in this measuring operation using measurement data obtained by this measuring operation (Step #12). In the case of the presence (YES in Step #12), the personal computer 20 judges whether or not the present number of measurements is equal to or above an upper limit value of the number of measurements designated by the operator (Step #13).

The personal computer 20 finishes the measuring operation for the measurement object S in the case of judging that the number of measurements has reached the upper limit value (YES in Step #13) while deriving a position of the measurement range where as many measurement data as possible can be obtained (Step #14) if the number of measurements has not yet reached the upper limit value (NO in Step #13). Then, the personal computer 20 judges whether or not a shift to this position of the measurement range is possible (whether or not this position lies beyond the measurable range of the 3D digitizer 10) (Step #15).

As a result, the personal computer 20 finishes the measuring operation for the measurement object S in the case of judging that the shift is impossible (NO in Step #15). On the other hand, in the case of judging that the shift is possible (YES in Step #15), the personal computer 20 returns to Step #11 for the measuring operation after causing the 3D digitizer 10 to change the position of the measurement range to the derived position in Step #14 (Step #16).

If the personal computer 20 judges the absence of an unmeasured area outside the measurement range in Step #12 (NO in Step #12), the 3D digitizer 10 finishes the measuring operation for the measurement object S.

The specific embodiments described above mainly contain inventions having the following constructions.

A 3D shape measuring system according to one aspect of the present invention comprises a measuring unit having a 3D measurement range and adapted to measure the 3D shape of a measurement object in a noncontact manner; a measurement range shifting unit for shifting the position of the measurement range of the measuring unit; a shape calculating unit for calculating the overall 3D shape of the measurement object from a plurality of measurement data obtained by shifting the measurement range relative to the measurement object; and a judging unit for setting a judgment area in a specified peripheral part in the measurement range and judging the presence or absence of any unmeasured area for the measurement object outside the measurement range based on the measurement data corresponding to the judgment area, wherein the measurement range shifting unit shifts the position of the measurement range in a direction toward the unmeasured area when the presence of the unmeasured area is judged by the judging unit.

According to this construction, the presence or absence of any unmeasured area for the measurement object outside the measurement range is judged based on the measurement data corresponding to the judgment area by the judging unit. If the presence of the unmeasured area is judged by the judging unit, the measurement range shifting unit shifts the measurement range in the direction toward the unmeasured area. By installing such judging unit and measurement range shifting unit in the 3D shape measuring system, there can be realized a 3D shape measuring system capable of measuring the 3D shape of a measurement object while automatically shifting the measurement range of the measuring unit.

For judgments as to the presence or absence of any unmeasured area outside the measurement range, the presence of an area yet to be measured outside the peripheral part can be judged if the measurement data is present in the judgment area, whereas the absence of the unmeasured area outside the measurement range can be judged if no measurement data is present in the judgment area. Therefore, it is preferable to judge the presence or absence of any unmeasured area based on the presence or absence of the measurement data in the judgment area.

In the case of dividing the judgment area into a plurality of blocks arranged in a specified direction, the absence of the unmeasured area outside the measurement range can be judged if the number of measurement data belonging to each block decreases toward the outer block in the specified direction. On the other hand, the presence of the unmeasured area can be judged if the number of measurement data increases toward the outer blocks in the specified direction or a change in the number of measurement data becomes smaller toward the outer blocks in the specified direction. Therefore, the judging unit preferably divides the judgment area into a plurality of blocks arranged in the specified direction and judges the presence or absence of any unmeasured area based on a distribution of the numbers of measurement data belonging to the respective blocks.

Further, the presence of an area yet to be measured outside the peripheral part can be judged if the inclination of the surface shape derived from the measurement data of the judgment area is moderate, whereas the absence of the unmeasured area outside the measurement range can be judged if the inclination of the surface shape is steep. Therefore, the judging unit may judge the presence or absence of any unmeasured area based on the inclination of the surface shape of the measurement object derived from the measurement data of the judgment area.

In the above construction, it is preferable that the measuring unit includes a light projector having a light source and a projecting optical system for introducing a light from the light source to the shape measurement object, and a light receiver for receiving a light outputted from the light projector and reflected by the measurement object, and outputs a distance between the measuring unit and the shape measurement object derived using the light received by the light receiver as the measurement data; that the judging unit sets the judgment area in a peripheral part in a first direction, in which the distance between the measuring unit and the measurement object is expressed, for the measurement range by a first measuring operation of the measuring unit, and judges the presence or absence of any unmeasured area outside the measurement range in the first direction based on the measurement data of the judgment area out of the measurement data obtained by the first measuring operation; and that the measurement range shifting unit shifts the position of the measurement range outward along the first direction before a second measuring operation following the first measuring operation is performed when the presence of the unmeasured area is judged by the judging unit.

According to this construction, the presence or absence of any unmeasured area outside the peripheral part in the first direction is judged based on the measurement data of the peripheral part in the first direction. If any unmeasured area is present, the position of the measurement range is shifted outward from the present position of the measurement range in the first direction, wherefore the 3D shape of the surface area present outside the peripheral part in the first direction can be measured.

In the above construction, it is preferable that the light receiver includes a light receiving surface and a focusing optical system for adjusting the focal point of the light introduced to the light receiving surface; and that the measurement range shifting unit shifts the position of a depth of focus corresponding to the measurement range outward from the position of the depth of focus in the first measuring operation along the first direction by changing the focal length of the focusing optical system.

According to this construction, the 3D shape in the unmeasured area present outside the peripheral part in the first direction can be measured.

In the above construction, the measurement range shifting unit can be constructed to shift the measurement range by changing the position of the measuring unit relative to the measurement object. According to this construction, the measurement range can be shifted in any arbitrary direction. It should be noted that the position of the measuring unit relative to the measurement object may be changed by moving the measurement object or moving the measuring unit.

In this case, it is preferable that the measuring unit includes a light projector having a light source and a projecting optical system for introducing a light from the light source to the shape measurement object, and a light receiver for receiving a light outputted from the light projector and reflected by the measurement object, and outputs a distance between measuring unit and the shape measurement object derived using the light received by the light receiver as the measurement data; that the judging unit sets the judgment area in a peripheral part in a second direction normal to the first direction, in which the distance between the measuring unit and the measurement object is expressed, for the measurement range by a first measuring operation of the measuring unit, and judges the presence or absence of any unmeasured area outside the measurement range in the second direction based on the measurement data of the judgment area out of the measurement data obtained by the first measuring operation; and that the measurement range shifting unit shifts the position of the measurement range outward along the second direction before a second measuring operation following the first measuring operation is performed when the presence of the unmeasured area is judged by the judging unit.

According to this construction, the 3D shape in the unmeasured area present outside the peripheral part in the second direction can be measured.

In the construction, it is preferable that a first input unit for receiving an input on a moving pitch of the measurement range by the measurement range shifting unit is further provided; and that the measurement range shifting unit shifts the measurement range at the moving pitch inputted by the first input unit. According to this construction, the moving pitch of the measurement range can be manually set since the first input unit is provided.

In this case, the first input unit preferably receives the moving pitch in the form of an absolute value or a relative value to the size of the measurement range.

In the above construction, it is preferable that a moving pitch deriving unit for deriving the moving pitch of the measurement range by the measurement range shifting unit based on the measurement data corresponding to the judgment area in the first measuring operation of the measuring unit is further provided; and that the measurement range shifting unit shifts the measurement range from the position of a first measurement range by the moving pitch derived by the moving pitch deriving unit before a second measuring operation following the first measuring operation is performed. According to this construction, labor and time required to manually set the moving pitch of the measurement range can be saved.

In the above construction, it is preferable that a second input unit for receiving an input designating the number of measurements to be made in the measuring operations per one measurement object by the measuring unit is further provided; and that the measurement range shifting unit shifts the measurement range so that the measuring operations by the measuring unit are performed with the number of measurements inputted via the second input unit as an upper limit. According to this construction, the prolongation of the overall measurement for one measurement object by an increased number of measurements can be prevented or suppressed.

In this case, the measurement range shifting unit preferably shifts the measurement range to a position where more measurement data can be obtained in a second measuring operation than in the first measuring operation upon performing the second measuring operation following the first measuring operation by the measuring unit. According to this construction, efficient measuring operations can be performed with the limited number of measurements.

The second input unit is preferably capable of receiving an input designating the number of measurements in each shifting direction when a plurality of shifting directions by the measurement range shifting unit are set for the measurement range. According to this construction, in the case of measuring the 3D shape of a measurement object having, for example, a shape longer in one direction, a larger number of measurements can be set for the one direction than for the other direction(s).

In the above construction, it is preferable that the judging unit sets a plurality of judgment areas within the measurement range and judges an unmeasured area in each judgment area; and that the measurement range shifting unit compares measurement data of the respective judgment areas, set priorities to the shifting directions of the measurement range by the measuring unit based on the comparison result and shifts the measurement range in accordance with the set priorities if the presence of a plurality of unmeasured areas is judged by the judging unit.

According to this construction, efficient measuring operations can be performed with the limited number of measurements and, even if an unmeasured area still remains, the size of this area can be maximally suppressed.

In the above construction, the measurement range shifting unit preferably stops the shift of the measurement range for a second measuring operation if a shift destination in the second measuring operation lies beyond a predetermined movable range of the measurement range upon performing the second measuring operation following the first measuring operation by the measuring unit. According to this construction, it can be prevented to perform an unnecessary measuring operation by moving the measurement range beyond the movable range.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A three-dimensional shape measuring system, comprising:
    a measuring unit having a three-dimensional measurement range and adapted to measure a three-dimensional shape of a measurement object in a noncontact manner;
    a measurement range shifting unit for shifting the position of the measurement range of the measuring unit;
    a shape calculating unit programmed to calculate an overall three-dimensional shape of the measurement object from a plurality of measurement data obtained by shifting the position of the measurement range relative to the measurement object; and
    a judging unit programmed to set a judgment area in a specified peripheral part of the measurement range and judge the presence or absence of any unmeasured area of the measurement object outside the measurement range based on measurement data corresponding to the judgment area,
    wherein the measurement range shifting unit is adapted to shift the position of the measurement range in a direction toward the unmeasured area when the presence of an unmeasured area is judged by the judging unit.

2. A three-dimensional shape measuring system according to claim 1, wherein the judging unit is adapted to judge the presence or absence of any unmeasured area of the measurement object outside the measurement range based on the presence or absence of the measurement data corresponding to the judgment area.

3. A three-dimensional shape measuring system according to claim 1, wherein the judging unit is adapted to judge the presence or absence of any unmeasured area outside the measurement range based on a distribution of respective numbers of measurement data belonging to respective blocks of a plurality of blocks arranged in a specified direction, wherein the plurality of blocks form the judgment area.

4. A three-dimensional shape measuring system according to claim 1, wherein the judging unit is adapted to judge the presence or absence of any unmeasured area outside the measurement range based on an inclination of a surface shape of the measurement object derived from the measurement data of the judgment area.

5. A three-dimensional shape measuring system according to claim 1, wherein:
the measuring unit includes a light projector having a light source and a projecting optical system for introducing a light from the light source to the measurement object, and a light receiver for receiving a light outputted from the light projector and reflected by the measurement object, and is adapted to output a distance between the measuring unit and the measurement object derived using the light received by the light receiver as the measurement data;
the judging unit is adapted to set the judgment area in a peripheral part of the measurement range for a first measuring operation of the measuring unit in a first direction, wherein the first direction is the direction in which the distance between the measuring unit and the measurement object is expressed, and is adapted to judge the presence or absence of any unmeasured area outside the measurement range in the first direction based on the measurement data of the judgment area out of the measurement data obtained by the first measuring operation; and
the measurement range shifting unit is adapted to shift the position of the measurement range outward along the first direction before a second measuring operation following the first measuring operation is performed when the presence of the unmeasured area is judged by the judging unit.

6. A three-dimensional shape measuring system according to claim 5, wherein:
the light receiver includes a light receiving surface and a focusing optical system for adjusting the focal point of the light introduced to the light receiving surface; and
the measurement range shifting unit is adapted to shift a position of a depth of focus corresponding to the measurement range outward from a position of the depth of focus in the first measuring operation along the first direction by changing the focal length of the focusing optical system.

7. A three-dimensional shape measuring system according to claim 1, wherein the measurement range shifting unit is adapted to shift the measurement range by changing the position of the measuring unit relative to the measurement object.

8. A three-dimensional shape measuring system according to claim 7, wherein:
the measuring unit includes a light projector having a light source and a projecting optical system for introducing a light from the light source to the measurement object, and a light receiver for receiving a light outputted from the light projector and reflected by the measurement object, and is adapted to output a distance between the measuring unit and the measurement object derived using the light received by the light receiver as the measurement data;
the judging unit is adapted to set the judgment area in a peripheral part of the measurement range for a first measuring operation of the measurement unit in a second direction normal to a first direction, wherein the first direction is the direction in which the distance between the measuring unit and the measurement object is expressed, is adapted to judge the presence or absence of any unmeasured area outside the measurement range in the second direction based on the measurement data of the judgment area out of the measurement data obtained by the first measuring operation; and
the measurement range shifting unit is adapted to shift the position of the measurement range outward along the second direction before a second measuring operation following the first measuring operation is performed when the presence of the unmeasured area is judged by the judging unit.

9. A three-dimensional shape measuring system according to claim 1, further comprising a first input unit for receiving an input on a moving pitch of the measurement range by the measurement range shifting unit, wherein the measurement range shifting unit is adapted to shift the measurement range at the moving pitch inputted by the first input unit.

10. A three-dimensional shape measuring system according to claim 9, wherein the first input unit is adapted to receive the moving pitch in the form of an absolute value or a relative value to the size of the measurement range.

11. A three-dimensional shape measuring system according to claim 1, further comprising a moving pitch deriving unit for deriving the moving pitch of the measurement range by the measurement range shifting unit based on the measurement data corresponding to the judgment area in a first measuring operation of the measuring unit, wherein the measurement range shifting unit is adapted to shift the measurement range from the position of a first measurement range by the moving pitch derived by the moving pitch deriving unit before a second measuring operation following the first measuring operation is performed.

12. A three-dimensional shape measuring system according to claim 1, further comprising a second input unit for receiving an input designating the number of measurements to be made in the measuring operations per one measurement object by the measuring unit, wherein the measurement range shifting unit is adapted to shift the position of the measurement range so that measuring operations by the measuring unit are performed with the number of measurements inputted via the second input unit as an upper limit.

13. A three-dimensional shape measuring system according to claim 12, wherein the measurement range shifting unit is adapted to shift the position of the measurement range to a position where more measurement data can be obtained in a second measuring operation than in a first measuring operation.

14. A three-dimensional shape measuring system according to claim 12, wherein the second input unit is capable of receiving an input designating a number of measurements in each shifting direction of a plurality of shifting directions by the measurement range shifting unit set for the measurement range.

15. A three-dimensional shape measuring system according to claim 12, wherein:
the judging unit is adapted to set a plurality of judgment areas within the measurement range and is adapted to judge an unmeasured area outside the measurement range based on each judgment area; and
the measurement range shifting unit is adapted to compare measurement data of the respective judgment areas, is adapted to set priorities to shifting directions of the measurement range by the measuring unit based on the comparison result and is adapted to shift the measurement range in accordance with the set priorities if the presence of a plurality of unmeasured areas is judged by the judging unit.

16. A three-dimensional shape measuring system according to claim 1, wherein the measurement range shifting unit is adapted to stop a shift of the measurement range for a measuring operation if a shift destination in the measuring operation lies beyond a predetermined movable range of the measurement range.

17. A computer program product stored on a tangible computer readable medium containing instructions executable by a computer for making a computer operate a three-dimensional shape measuring system including a measuring unit having a three-dimensional measurement range, said instructions being configured, when executed by a computer, to make the computer perform a process comprising the steps of:
 measuring a three-dimensional shape of a measurement object in a noncontact manner using the measuring unit;
 calculating an overall three-dimensional shape of the measurement object based on measurement data;
 setting a judgment area in a specified peripheral part of the measurement range of the measuring unit;
 identifying an unmeasured area of the measurement object outside the measurement range based on measurement data corresponding to the judgment area; and
 shifting the position of the measurement range in a direction toward the unmeasured area when the unmeasured area is identified.

18. A three-dimensional shape measuring system for measuring a three-dimensional shape of a measurement object in a noncontact manner comprising:
 a three-dimensional digitizer including:
  a measuring unit having a three-dimensional measurement range, wherein the measuring unit is adapted to measure a three-dimensional shape of a measurement object in a noncontact manner,
  a first communication unit, and
  a stage driving unit for changing the position of the measurement unit relative to the measurement object; and
 a computer adapted to communicate with the three-dimensional digitizer, the computer including:
  a second communication unit, and
  a processor programmed to calculate an overall three-dimensional shape of the measurement object based on measurement data received from the three-dimensional digitizer via the respective communication units of the computer and the three-dimensional digitizer, set a judgment area in a specified peripheral part of the measurement range of the measuring unit, identify an unmeasured area of the measurement object outside the measurement range based on measurement data corresponding to the judgment area, and communicate instructions to the three-dimensional digitizer via the respective communication units of the computer and the three-dimensional digitizer to shift the position of the measurement range in a direction toward the unmeasured area when the unmeasured area is identified by the processor.

19. A three-dimensional shape measuring system according to claim 18, wherein the processor is programmed to identify an unmeasured area of the measurement object outside the measurement range based on the presence or absence of the measurement data corresponding to the judgment area.

20. A three-dimensional shape measuring system according to claim 18, wherein the processor is programmed to identify an unmeasured area of the measurement object outside the measurement range based on a distribution of respective numbers of measurement data belonging to respective blocks of a plurality of blocks arranged in a specified direction, wherein the plurality of blocks form the judgment area.

21. A three-dimensional shape measuring system according to claim 18, wherein the processor is programmed to identify an unmeasured area outside the measurement range based on an inclination of a surface shape of the measurement object derived from the measurement data of the judgment area.

* * * * *